(12) United States Patent
Lu

(10) Patent No.: US 12,287,238 B2
(45) Date of Patent: Apr. 29, 2025

(54) AUTOMATED LIGHT TESTING APPARATUS AND METHOD

(71) Applicant: FJP Solution LLC, Chino, CA (US)

(72) Inventor: Fang Lu, Chino, CA (US)

(73) Assignee: FJP Solution LLC, Chino, CA (US)

( * ) Notice: Subject to any disclaimer, the term of this patent is extended or adjusted under 35 U.S.C. 154(b) by 225 days.

(21) Appl. No.: 17/883,247

(22) Filed: Aug. 8, 2022

(65) Prior Publication Data

US 2024/0044702 A1 Feb. 8, 2024

(51) Int. Cl.
*G01J 1/42* (2006.01)
*G01M 11/02* (2006.01)

(52) U.S. Cl.
CPC ....... *G01J 1/4257* (2013.01); *G01M 11/0214* (2013.01); *G01J 2001/4252* (2013.01)

(58) Field of Classification Search
CPC ..... B24B 9/148; B24B 9/14; B29D 11/00932; B29D 11/00961; G01J 1/4257; G01J 2001/4252; G01J 2001/4247; G01M 11/0214
USPC ........................ 356/237, 2, 237.6, 237.5, 402
See application file for complete search history.

(56) References Cited

U.S. PATENT DOCUMENTS

| | | | |
|---|---|---|---|
| 7,846,009 B2 * | 12/2010 | Mazoyer | B24B 41/005 451/8 |
| 7,876,428 B2 * | 1/2011 | Divo | G01M 11/0214 356/124 |
| 2007/0291258 A1 * | 12/2007 | Divo | G01M 11/0235 356/124 |
| 2008/0192200 A1 * | 8/2008 | Iribarne | B29D 11/00961 356/127 |
| 2010/0228375 A1 * | 9/2010 | Brechemier | B24B 9/146 700/110 |
| 2023/0356338 A1 * | 11/2023 | Eble | B23Q 3/15533 |

\* cited by examiner

*Primary Examiner* — Isiaka O Akanbi
(74) *Attorney, Agent, or Firm* — Enable IP, P.C.

(57) ABSTRACT

An automated light testing apparatus including: a test platform including one or more recesses configured to secure a light product, each recess configured to fit a main light of the light product; a light sensor built in each of the one or more recesses, each light sensor configured to detect light from the respective main light held by the recess; a horizontal beam parallel to a surface of the test plat form; a test arm movably attached to the horizontal beam, the test arm controlled by one or more motors and configured to be moved into a plurality of positions when testing the light product; and a controller configured to set one or more parameters of the testing apparatus and transmit control signals to the light sensor and test arm.

14 Claims, 5 Drawing Sheets

AUTOMATED LIGHT TESTING APPARATUS AND METHOD

FIELD

This relates generally to automated testing equipment and methods and, more particularly, to an automated light testing system and method.

BACKGROUND

The finished products produced by the existing light assembly line are manually inspected. In one setup, for example, one person is responsible for checking the various components of the light: the light source, switches, etc., and another person is responsible for the testing certain functions of the light (e.g., motion sensing). This type of manual inspection has to be done in serial. That is, one worker can only inspect one finished light at a time. The whole process is labor intensive and highly inefficient. Therefore, a testing apparatus capable of automated inspection of finished lights is desired to improve the efficiency of inspection process and, in turn, reduce overall manufacturing cost.

SUMMARY

An automated light testing apparatus is disclosed. The apparatus includes: a test platform including one or more recesses configured to secure a light product, each recess configured to fit a light of the light product; a light sensor built in each of the one or more recesses, each light sensor configured to detect light from the respective light held by the recess; a horizontal beam parallel to a surface of the test plat form; a test arm movably attached to the horizontal beam, the test arm controlled by one or more motors and configured to be moved into a plurality of positions when testing the light product; and a controller configured to set one or more parameters of the testing apparatus and transmit control signals to the light sensor and test arm.

DETAILED DESCRIPTION OF THE PREFERRED EMBODIMENTS

In the following description of preferred embodiments, reference is made to the accompanying drawings which form a part hereof, and in which it is shown by way of illustration specific embodiments, which can be practiced. It is to be understood that other embodiments can be used and structural changes can be made without departing from the scope of the embodiments of this disclosure.

In general, this disclosure relates to automated testing apparatus for testing finished light products. As referred to in this document, light products can include any type of lights such as security lights, outdoor lights, indoor lights, desk lamps, floor lamps, LED lights, halogen lights, fluorescent lights. A light product can include one or more main light sources. Some light products can include one or more LED indicators. The light products can have different designs, sizes, and functions. The automated testing apparatus can be customized based on the light products being tested.

Embodiments of the automated testing apparatus can be configured to perform any number of tests on finished light products. For example, the testing apparatus can test the operation of the switch(es) and/or the sensing functions of the light products.

To automate the testing of the light products, embodiments of the testing apparatus overcome a number of technical hurdles. First, the testing apparatus has to provide a mechanism to secure the light product in a fixed position on the testing platform. The testing apparatus is also built with a mechanical arm that can be programmed to automatically engage the switches on the light product during the testing procedure. The mechanical arm can be reprogrammed to work with different light products (e.g., light products having switches located at different parts of the products and/or having different initial positions). In some embodiments, robots working in tandem with the testing apparatus also needs to be programmed according to the product being inspected.

Figure 1:
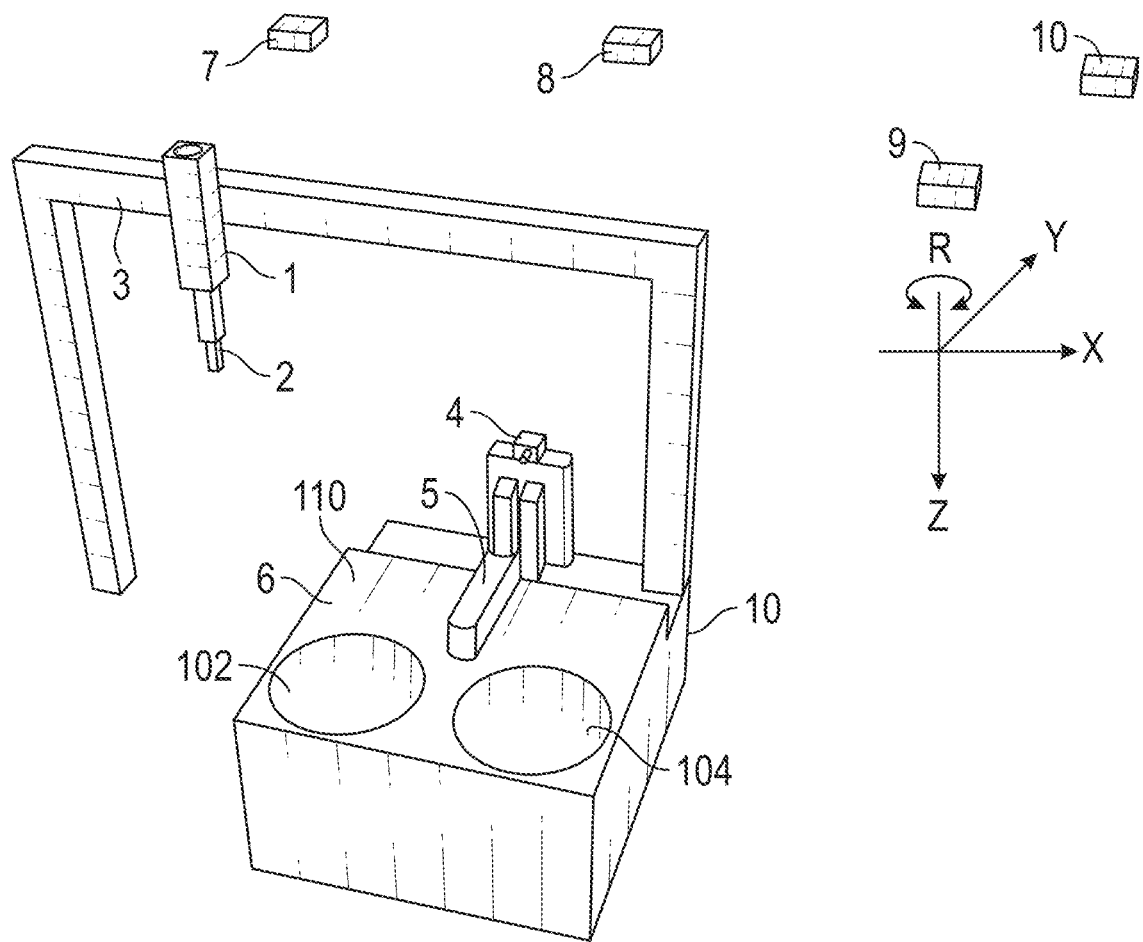
FIG. 1 illustrates the exemplary components of an automated light test apparatus, according to an embodiment of the disclosure.
Figure 3:
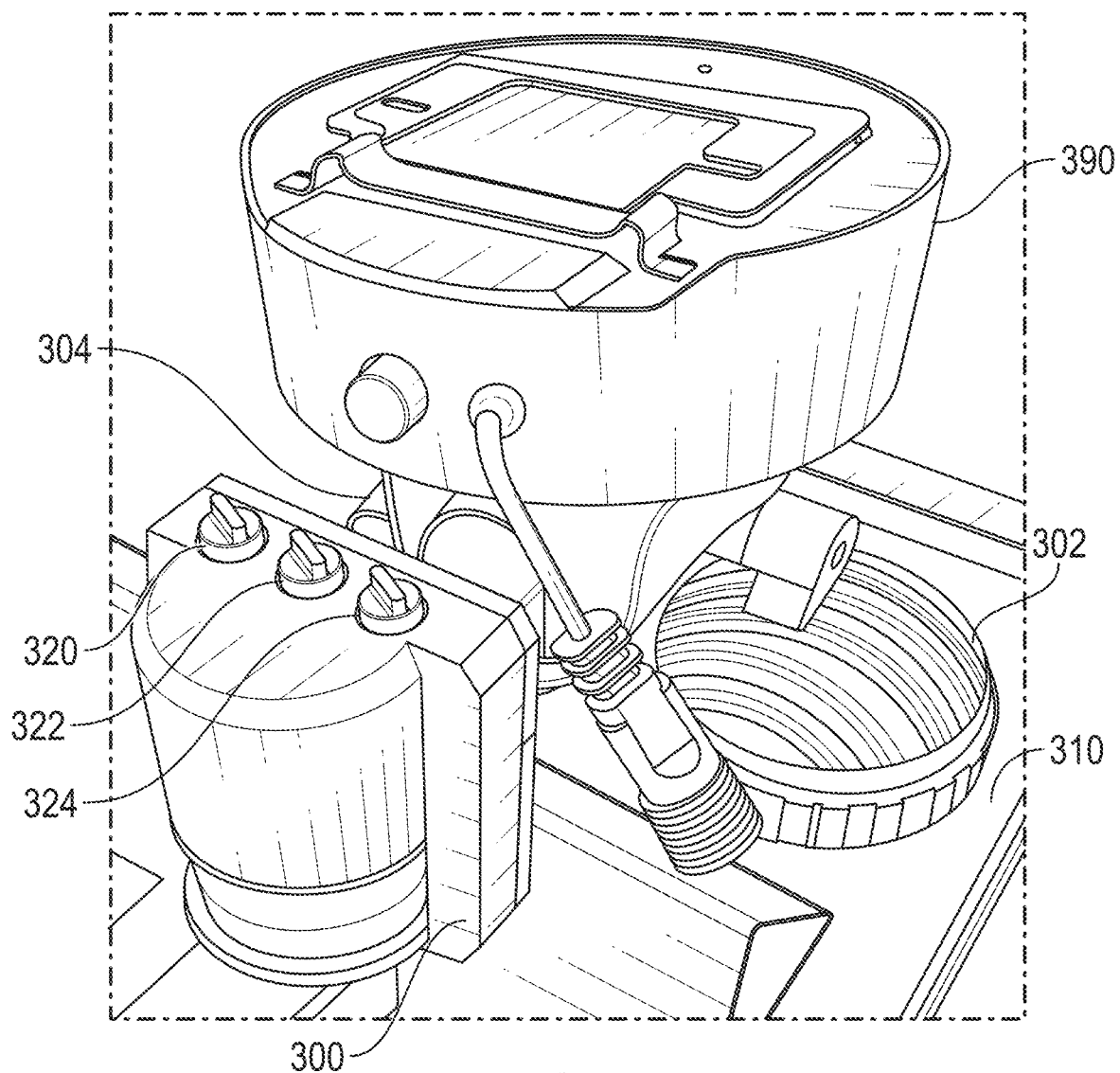
FIG. 3 illustrates a finished light being tested using the automated light test apparatus of FIG. 1, according to an embodiment of the disclosure.

FIG. 1 illustrates an exemplary testing apparatus 100, according to an embodiment of the disclosure. The testing apparatus 100 can include a testing platform 110 including a securing mechanism for securing the light product during testing. In this embodiment, the light product being tested is a dual security light, such as the one illustrated in FIG. 3. The securing mechanism includes two round-shaped recesses 102, 104 designed to hold the two main lights of the light product in place when it is being tested. FIG. 3 illustrates two main lights 302, 304 of a security light 390, being placed in the recesses 302, 304 when the security light 390 is positioned upside down on the testing platform 310 of the testing apparatus 300.

Referring back to FIG. 1, one or more light sensors (not visible in FIG. 1) can be positioned in or beneath the recesses 102, 104 to detect light emitting from the main lights held in the recesses 102, 104 during the automated inspection process.

The testing apparatus 100 can include additional product securing mechanism (e.g., protrusion 5) that can further prevent unintended displacement of the light product when the light product is placed on the testing apparatus 100. In this embodiment, the protrusion 5 can include one or more LEDs that indicate whether or not the testing apparatus is in operation.

Depending on the design of the light product being tested, the testing apparatus 100 can incorporate different means for securing the product. For example, there can be a different number of recesses built in the test apparatus. The recess(es) can be of different shapes to conform to the shape of the product or parts of the light product being tested. In other examples, the securing mechanism does not have to include one or more recesses on the platform. Any securing mechanism suitable for the testing apparatus can be incorporated.

The testing apparatus 100 can also include a testing arm 1 movably attached to a horizontal beam 3 of the testing apparatus 100. The head of the testing arm 1 can include a switch actuator 2. The switch actuator 2 can be used to actuate one or more switches of the light product being tested. The one or more switches can be push buttons or knobs that control one or more lights of the light product. In this embodiment, the switch actuator 2 can be designed to actuate (e.g., rotate) the switch knobs. However, it should be understood that, in other embodiment, the actuator can be designed to actuate other types of switches that may be used on the finished light product.

The testing apparatus 100 can be equipped with one or more motors (not shown in FIG. 1) for controlling the movement of a testing arm 1. For example, the test apparatus 100 can include a first motor to control the movement of the testing arm 1 along the horizontal beam 3 (e.g., movement in the X-axis). The test apparatus 100 can include a second motor for controlling the movement of the testing arm 1 along the z-axis (e.g., moving towards the test platform 110). The test apparatus 100 can also include a third motor for rotating the switch actuator 2 at the tip of the testing arm 1. The first, second, and third motors can be housed in the test apparatus 100. When working in tandem, the three motors can move the testing arm 1 into positions to actuate one or more switches on the light product during the automated inspection of the product. In other embodiments, the movement of the testing arm 1 may be controlled by a different number of motors.

The testing apparatus 100 can include an actuator 4 for turning on and off the main switch of the product being tested. In this embodiment, actuator 4 can be aligned with the main on/off switch of the light product when the light product is placed on the testing platform 110. Actuator 4 can be programmed to automatically extend to actuate the main switch on the light product after the light product is secured on the testing apparatus 100 to initiating the test process. It should be understood that other types of switches can also be used to operate the main on/off switches of the light product.

The testing apparatus 100 can also include one or more infrared light sources 7, 8, 9, 10. The infrared light sources 7, 8, 9, 10 can be strategically positioned at different locations around the light product. These infrared light sources do not need to be affixed to the testing apparatus 100. The infrared light from these infrared light sources 7-10 can be used for simulating the presence of a human within certain parameter of the light product.

Figure 2A:
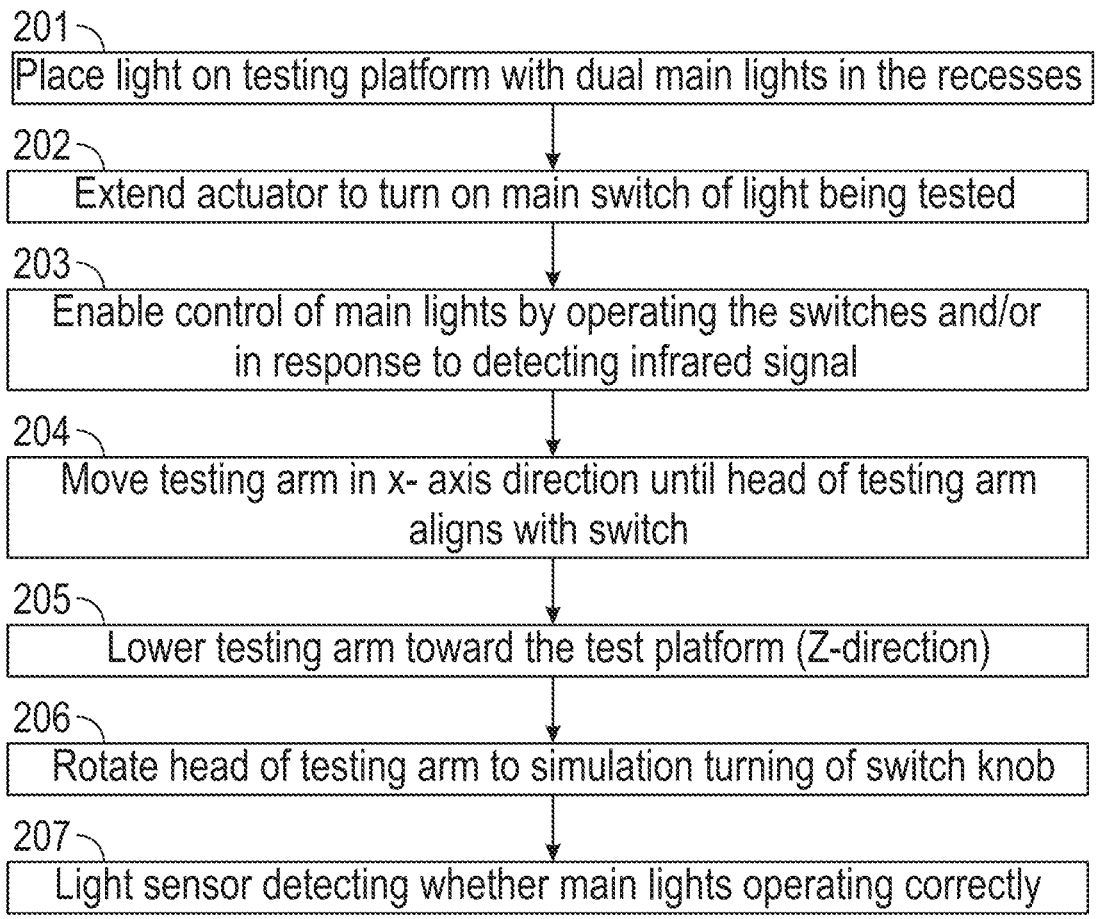
FIGS. 2a and 2b illustrate the exemplary steps of an automated inspection process for finished lights, according to an embodiment of the disclosure.
Figure 2B:
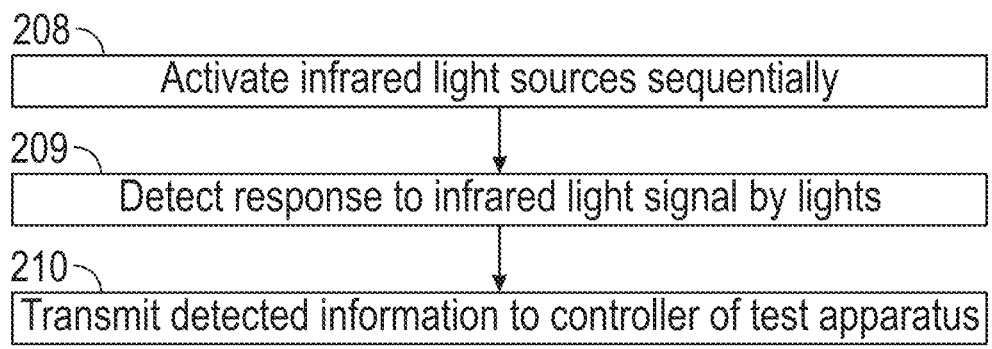

FIGS. 2a and 2b illustrate the exemplary steps in the operation of the automated light testing apparatus of FIG. 1, according to an embodiment of the disclosure. In this embodiment, the light product being tested is a security light with dual main lights and a number of switches. The test apparatus can perform several automated tests on the light product to check the operation of the lights in response to turning on and off the switches and/or the infrared signals. It should be understood that the steps illustrated in FIGS. 2a and 2b can also be applied, with or without modification, for testing other types of light products.

Referring to FIG. 2a, first, the finished light can be placed on the testing platform with the dual main lights secured in the recesses 102, 104 (step 201), as shown in FIG. 3. Once the finished light is secured, the actuator 4 of the testing apparatus can be extended to push the main switch on the finished light to start the testing process (step 202). This initiates the automated inspection of the light. In one embodiment, when the main switch of the light product is switched on, the main lights can be controlled (e.g., turned on and off) by operating the switches and/or in response to detecting infrared signals. (step 203).

As illustrated in FIG. 3, the security light in this embodiment has three switch knobs 320, 322, 324 that can have different functions such as, but not limited to, adjusting the infrared sensitivity, adjusting the timer function of the light, and adjusting the ambient light sensitivity of the light product. To test these switches 320, 322, 324, a controller of the testing apparatus is programmed to move the testing arm 1 into one or more positions to actuate the switches 320, 322, 324. First, the testing arm 1 is moved by a first motor in the X-axis along the horizontal beam 3 to a position in which the head of the testing arm 1 is aligned in the Z-direction with the first switch 320 (step 204). Next, the testing arm 11 can be lowered in the Z-axis (e.g., towards the testing platform 110) by a second motor (step 205). When the head 2 of the testing arm 1 is lowered enough to engage the first switch 320, the third motor can generate rotational torque to rotate the head 2 of the testing arm 1 clockwise and/or counter-clockwise to simulate the manual operation of turning the switch knob 320 (step 206).

The third motor (i.e., the torque module) of the testing arm 1 can be set to produce the right amount of torque to rotate the switch knob. If the torque exceeds the limit (the maximum torque limit of the switch knob) during the rotating of the knob 320, the torque module can automatically trip to prevent damage to the switch knob 320.

After the rotating of the switch knob 320 is completed, the light sensor in one of the recesses 102 can detect whether the main light is operating correctly in response to the actuation of the switch (Step 207). For example, if the first switch controls turn on the ambient light sensing function of the light product, the light sensor can detect whether the main light is turned on when the switch is turned and there is sufficient ambient light.

The same steps 201-207 described above can be repeated to test the functions of switch knobs 322, 324. For example, switch knob 322 may control the sensitivity of the infrared sensor of the light product. As illustrated in FIG. 2b, after the switch 322 is actuated by the actuator on the testing arm in Step 206, the infrared light sources 7, 8, 9, and 10 can be activated one by one according to a preset sequence to send infrared signals to the light product (step 208). The infrared signals simulate the presence of a human. The infrared sensing module of the light product can detect whether the two main lights are working properly in response to the infrared signals from the infrared sources 7, 8, 9, 10, given the sensitivity level set by switch knob 322 (step 209). The infrared sensing module can transmit the result of this test to the controller of the testing apparatus for further processing (step 210).

In some embodiments, the light sensors of the testing apparatus can also detect the intensity, color, and/or flashing rate of the main lights 302, 304 and enable additional tests on the light product. The light sensor and infrared sensing module can transmit the captured test data to a controller of the testing apparatus, as will be discussed in detail below.

After the above-described tests are completed, the test arm 1 can be returned to its default position. The light product can be removed either manually or by a robot from the testing apparatus.

Figure 4:
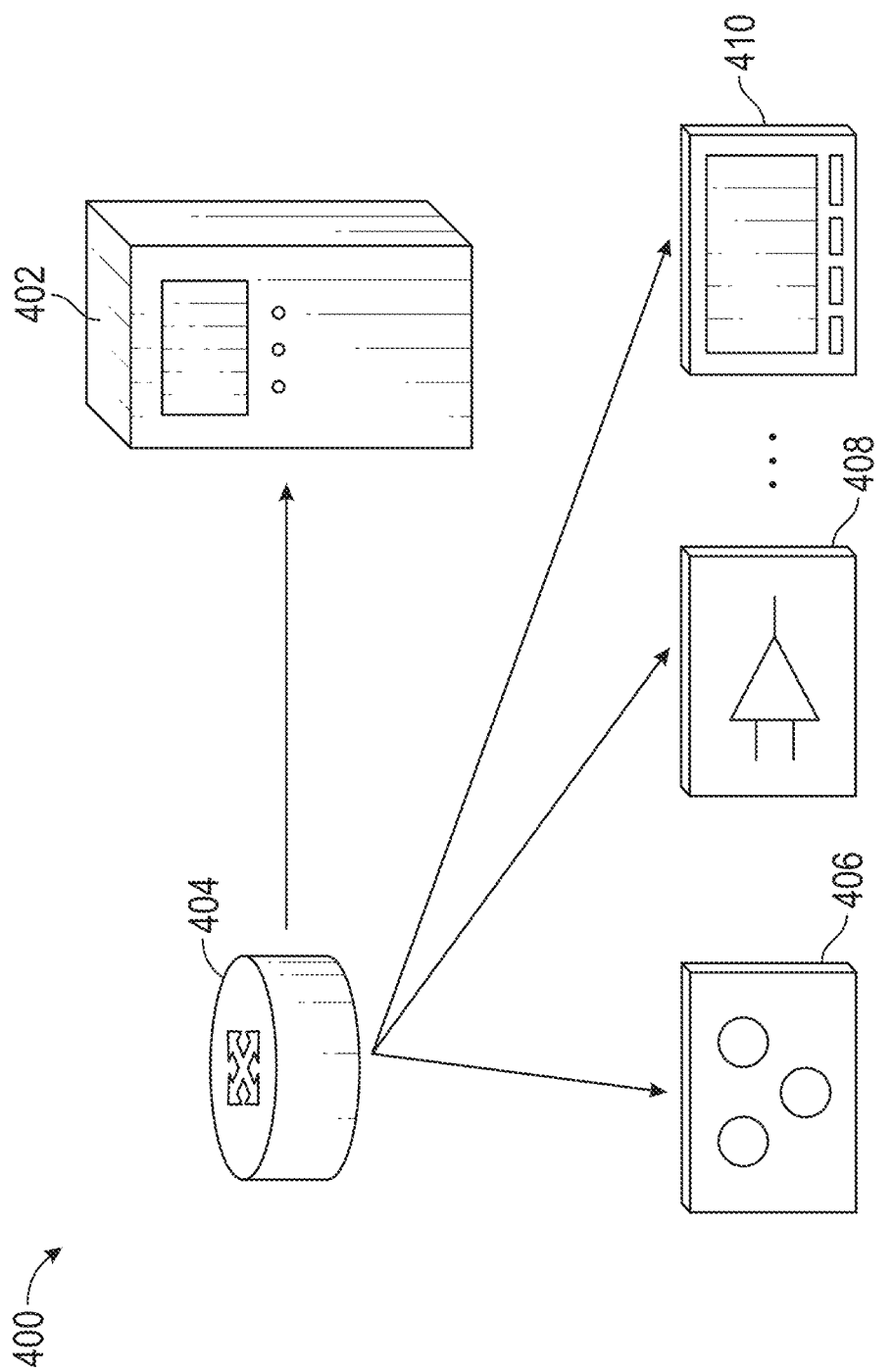
FIG. 4 illustrates the exemplary modules of an automated light test system, according to an embodiment of the disclosure.

FIG. 4 is a system diagram illustrating the exemplary modules of an automated light testing apparatus, according to an embodiment of the disclosure. The automated light testing apparatus 400 can include a controller 402, an Ethernet switch 404, one or more light sensing modules 406, and a light source control module 408. The automated light testing apparatus 400 can also have other optional modules 410 such as other control and sensing modules. The controller 402 can be connected to the one or more lighting sensing modules 406 and light source control module 408 via the Ethernet switch 404. It should be understood that other types of network can also be used for connecting the different modules 406, 408 and the controller of system 400.

Figure 5:
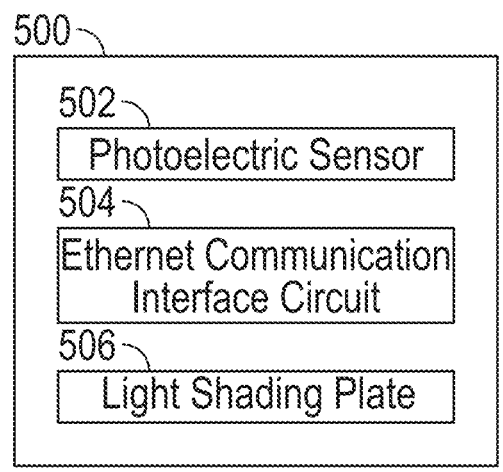
FIG. 5 illustrates the exemplary modules of a light sensing module of the automated light test system of FIG. 4, according to an embodiment of the disclosure.

FIG. 5 illustrates exemplary modules of the light sensing modules 406 of FIG. 4. The light sensing modules 500 of FIG. 5 can include a photoelectric sensor 502 capable of detecting light, Ethernet communication interface circuit 504, and a light shading plate 506. As discussed above, the light sensing modules 500 can detect light from various lights of the light product being tested using the automated testing apparatus. It can be used for sensing the response of the lights when the light product is stimulated by the testing apparatus, e.g., by adjusting the potentiometer and/or emitting infrared light from a distance. Ethernet communication interface circuit 504 can facilitate communication between the light sensing modules 500 and the other modules of the testing apparatus. The light shading plate 506 can be positioned to block ambient light from light sources outside of the light product being tested.

Figure 6:
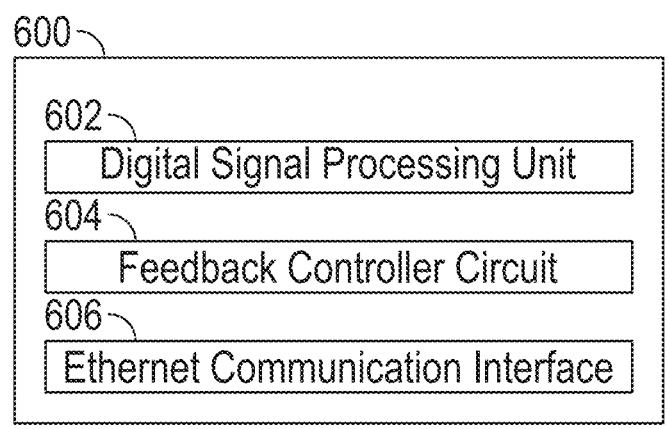
FIG. 6 illustrates the exemplary modules of a light source control module of the automated light test system of FIG. 4, according to an embodiment of the disclosure.

FIG. 6 illustrates the exemplary modules of a light source control module 408 of the automated light testing apparatus 400 of FIG. 4. The light source control module 600 of FIG. 6 can include a digital signal processing circuit 602, a feedback controller circuit 604, and also an Ethernet communication interface 606. The light source control module 600 can be programmed to control the operating points of the artificial infrared light source(s) (e.g., infrared light sources 7-10 of FIG. 1) so the infrared light source(s) can emit standard background radiation with spectral characteristics similar to that of the human body. The digital signal processing circuit 602 can process signals from the feedback controller module 604 and communicate with other modules of the testing apparatus via the Ethernet communication interface 606. The Ethernet communication interface 606 can facilitate communication between the light source control module 600 and other modules of the test apparatus.

Referring back to FIG. 4, the tester can operate a human-machine interface (HMI) on the controller 402 to send commands to each module of the light testing apparatus 400 to adjust various parameters of the tests. The controller 402 can also be used to set up test parameters for a particular light product.

Embodiments of the automated light testing apparatus disclosed above can eliminate a number of manual steps from the existing testing processes. In some embodiments, this is an automatic single-station testing system for testing light products, and one light product is tested at a time. In one embodiment, after a light product is powered on, there is the self-check described above that may last about 60 seconds or less. During the self-check, the functions of the switch(es) on the light products can be tested.

After the self-check is completed, the system can control the infrared light source(s), which may take about 3 seconds or less, to simulate the human body to make the light product respond. At this time, the LEDs of the light product can flash for a number of times (e.g., twice) at a specific frequency (e.g., about 1 Hz). The sensors of the testing apparatus can detect the flashing of the LEDs to determine whether the light product is working normally. The step should also take about 3 seconds or less, depending on the LED flashing frequency. To reduce error in the test results, multiple iterations of the tests can be performed. Yet, the total time that the automated testing apparatus takes to complete the inspection of one light product can still be significantly shorter that if the same testing is done with existing manual processes.

In some embodiments, due to the complex structure of the variety types of light products, the automatic testing scheme described herein is single-station lamp inspection. That is, the inspection of a single finished lamp is performed at one station at a time. In other embodiments, multi-station joint inspection, automatic robot loading and unloading and other functions can be added to the above-described processes.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. An automated light testing apparatus comprising:
a test platform including one or more recesses configured to secure a light product, each recess configured to fit a main light of the light product;
a light sensor built in each of the one or more recesses, each light sensor configured to detect light from the respective main light held by the recess;
a horizontal beam parallel to a surface of the test platform;
a test arm movably attached to the horizontal beam, the test arm controlled by one or more motors and configured to be moved into a plurality of positions when testing the light product; and
a controller configured to set one or more parameters of the testing apparatus and transmit control signals to the light sensor and test arm.

2. The automated light testing apparatus of claim 1, further comprising one or more infrared light sources, each positioned to transmit infrared signal to the light product.

3. The automated light testing apparatus of claim 2, wherein the controller is configured to activate the one or more infrared light sources in serial.

4. The automated light testing apparatus of claim 1, wherein the test arm comprises a rotatable head configured to actuate a switch knob on the light product.

5. The automated light testing apparatus of claim 1, wherein the test arm is movable horizontally along the beam and vertically towards the light product.

6. The automated light testing apparatus of claim 5, wherein the one or more motors comprise a first motor configured to move the test arm horizontally along the beam and a second motor configured to move the test arm vertically in the direction of the light product.

7. The automated light testing apparatus of claim 1, wherein the light sensor comprises:
a photoelectric sensor configured to detect light; and
an ethernet communication interface circuit configured to enable communication between the light sensor and the controller.

8. The automated light testing apparatus of claim 7, wherein the light sensor further comprises a light shading plate configured to block ambient light.

9. The automated light testing apparatus of claim 7, wherein the light sensor is configured to detect an intensity, a color, and a flashing rate of a light.

10. The automated light testing apparatus of claim 1, further comprising a light source control module.

11. The automated light testing apparatus of claim 9, Wherein the light source control module comprises:
 a feedback controller module;
 a communication interface configured to facilitate communication between the light source control module and the controller; and
 a digital signal processing unit configured to process signals from the feedback controller module and communicate with other modules of the testing apparatus via the Ethernet communication interface.

12. The automated light testing apparatus of claim 1, further comprising an Ethernet hub configured to facilitate communications from and to the controller.

13. The automated light testing apparatus of claim 1, further comprising a robot configured to place the light product on the testing apparatus such that one or more parts of the light product is fitted with the one or more recesses of the testing apparatus.

14. A computer-implemented method of automatically testing a light product, the method comprising a controller performing the steps of:
 controlling a robot to place the light product on a testing apparatus such that one or more parts of the light product is secured in one or more recesses of the testing apparatus;
 controlling a cylinder of the testing apparatus to actuate a main switch of the light product;
 controlling a movement of a testing arm of the testing apparatus to align a head of the testing arm with a first switch of the light product;
 engaging the first switch of the light product using the head of the testing arm;
 turning on a plurality of infrared lights in serial; and
 capturing data from a light sensor detecting infrared light from the infrared light.

* * * * *